United States Patent
Wright et al.

(10) Patent No.: US 8,096,228 B1
(45) Date of Patent: Jan. 17, 2012

(54) BENT AXIS DUAL YOKE HYDROMODULE

(75) Inventors: Joseph Wright, Ames, IA (US); Doug Kardell, Grimes, IA (US); Russell Peters, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 585 days.

(21) Appl. No.: 12/188,358

(22) Filed: Aug. 8, 2008

(51) Int. Cl.
*F01B 3/00* (2006.01)
*F01B 13/04* (2006.01)
*F01B 9/02* (2006.01)
*F01B 31/14* (2006.01)
*F15B 15/24* (2006.01)

(52) U.S. Cl. .............. 91/505; 92/13; 92/71; 92/57

(58) Field of Classification Search .............. 91/505, 91/506; 92/12.2, 13, 57, 71
See application file for complete search history.

(56) References Cited

U.S. PATENT DOCUMENTS

| | | | |
|---|---|---|---|
| 3,530,669 A | 9/1970 | Bromell et al. | |
| 3,733,963 A * | 5/1973 | Kubilos | 91/3 |
| 3,958,496 A * | 5/1976 | Wallin | 91/506 |
| 4,122,757 A * | 10/1978 | McConnell et al. | 91/506 |
| 4,405,288 A | 9/1983 | Stockton | |
| RE31,711 E * | 10/1984 | Horiuchi | 417/222.1 |
| 4,788,902 A | 12/1988 | Akasaka et al. | |
| 4,872,394 A * | 10/1989 | Nakagawa et al. | 91/506 |
| 5,094,144 A | 3/1992 | Akasaka et al. | |
| 5,182,978 A | 2/1993 | Akasaka et al. | |
| 5,231,912 A | 8/1993 | Akasaka et al. | |
| 6,203,283 B1 * | 3/2001 | Fleming et al. | 417/222.1 |
| 6,257,119 B1 * | 7/2001 | Ryken et al. | 91/506 |
| 6,260,468 B1 * | 7/2001 | Ryken et al. | 91/506 |
| 6,279,452 B1 * | 8/2001 | Moya | 91/506 |
| 6,283,721 B1 * | 9/2001 | Gollner | 417/222.1 |
| 6,358,174 B1 * | 3/2002 | Folsom et al. | 475/72 |
| 6,381,529 B1 | 4/2002 | Mistry | |
| 6,422,254 B1 * | 7/2002 | Ryken | 137/1 |
| 6,874,994 B2 | 4/2005 | Folsom et al. | |
| 6,996,980 B2 * | 2/2006 | Fleming et al. | 60/487 |
| 7,159,395 B2 | 1/2007 | Fleming et al. | |
| 7,503,173 B2 * | 3/2009 | Dong et al. | 60/444 |
| 7,967,574 B2 * | 6/2011 | Achten | 417/269 |
| 2004/0022645 A1 * | 2/2004 | Rousset | 417/269 |
| 2004/0261408 A1 * | 12/2004 | Fleming et al. | 60/487 |
| 2006/0006018 A1 * | 1/2006 | Fleming et al. | 180/242 |
| 2006/0024172 A1 * | 2/2006 | Macal et al. | 417/269 |
| 2007/0277520 A1 | 12/2007 | Gollner | |
| 2009/0020004 A1 * | 1/2009 | Gollner | 91/505 |

* cited by examiner

*Primary Examiner* — Devon C Kramer
*Assistant Examiner* — Thomas Fink
(74) *Attorney, Agent, or Firm* — Zarley Law Firm, P.L.C.

(57) ABSTRACT

A bent axis hydromodule that has a yoke that is rotatable about trunnions and rotating kits having rotating kit shafts that are in fluid communication with the yoke. Servo piston porting is integrated within the yoke and positioned about the trunnion such that servo pistons are in fluid communication with the servo piston porting and operable to rotate the yoke about a trunnion axis.

2 Claims, 4 Drawing Sheets

BENT AXIS DUAL YOKE HYDROMODULE

BACKGROUND OF THE INVENTION

This invention relates to a hydromodule. More specifically, the invention relates to a bent axis dual yoke hydromodule packaged to fit in a compact space with high reliability.

Bent axis type hydromodules are well known in the art. An example of such a hydromodule can be seen in U.S. Patent Publication No. 2007/0277520 to Gollner. That particular bent axis hydromodule provides for a dual yoke that contains two rotating kits mounted within a common housing. The yoke has journals or trunnions at either end upon which the yoke can swing in order to provide different fluid displacement within the module. Typically a separate servo system having servo pistons are used to rotate the yoke about a trunnion axis.

While current bent axis dual yoke hydromodules are effective at providing a power output many problems remain. For example, by having a separate control and servo system that is used to swing the yoke, causes the entire system to be large and bulky. Additionally, the system has many moving parts which add to the bulkiness of the system and causes the system to be expensive to manufacture.

Therefore, a principal object of the present invention is to minimize the size of a bent axis dual yoke hydromodule.

Yet another object of the present invention is to provide a bent axis dual yoke hydromodule that is inexpensive to manufacture.

These and other features, objects and advantages will become apparent from the specification and claims.

BRIEF SUMMARY OF THE INVENTION

A bent axis hydromodule having a yoke that is rotatable about trunnions. The bent axis hydromodule additionally has rotating kits that have rotating kit shafts that are in fluid communication with the yoke. Servo piston porting is integrated within the yoke and positioned about the trunnion such that servo pistons that are in fluid communication with the servo piston porting are operable to rotate the yoke about a trunnion axis. Consequently, servo flow is ported from the hydrostatic loop to actuate the servos and no additional flow source is necessary.

DETAILED DESCRIPTION OF THE PREFERRED EMBODIMENT

Figure 1:
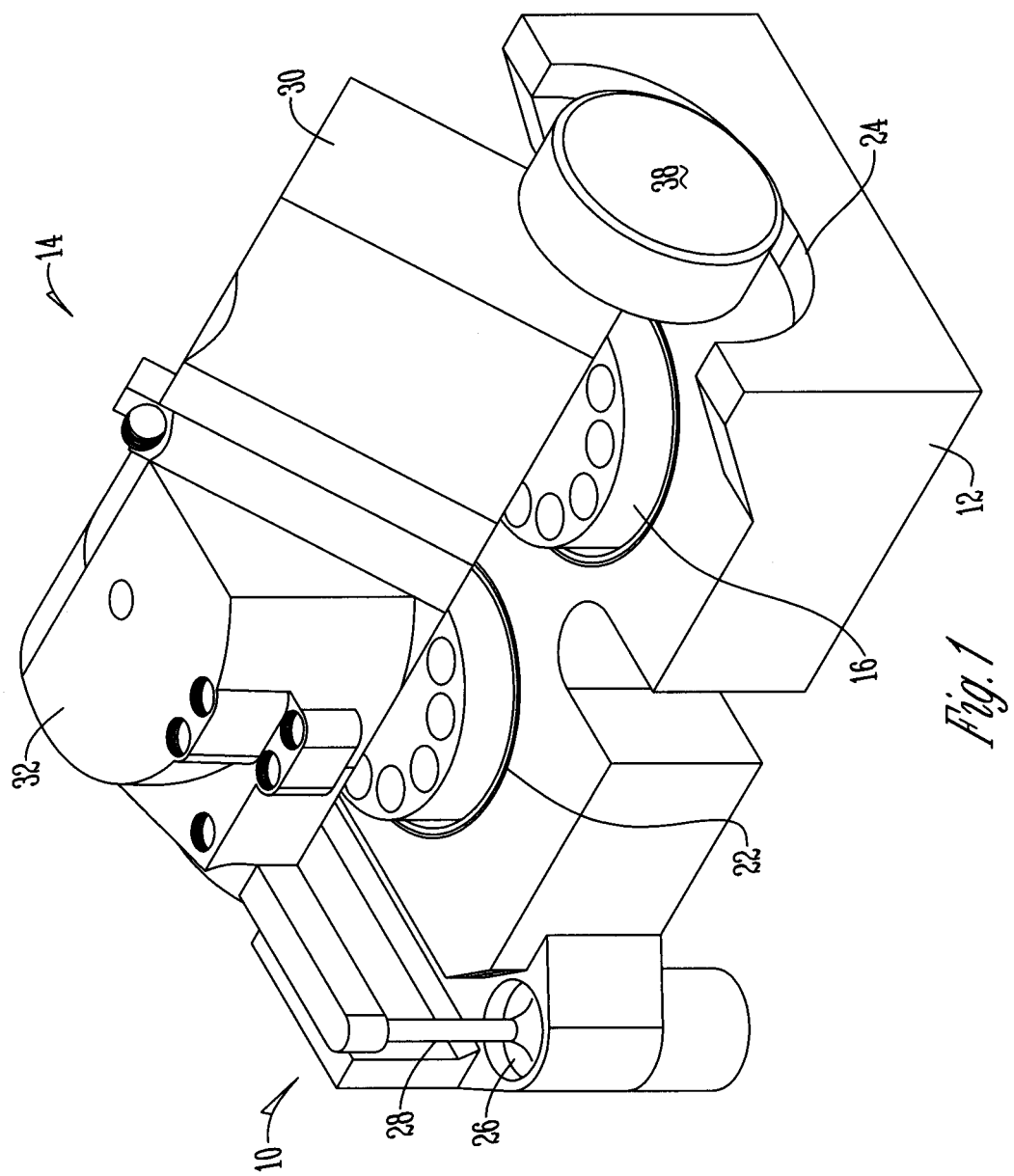
FIG. 1 is a side perspective view of a bent axis dual yoke hydromodule.

FIG. 1 shows a bent axis dual yoke hydromodule 10. The hydromodule 10 is comprised of a frame 12 upon which a yoke 14 and rotating kits 16 having rotating kit shafts (not shown) are mounted.

The frame 12 includes opening 22 disposed therein for receiving the rotating kits 16 and receptacles 24 for receiving the yoke 14. Additionally, integrated on the frame 12 is servo piston porting and servo piston bore 26. The servo piston bore 26 specifically receives a servo piston 28 and places the servo piston 28 in fluid communication with the servo piston bore 26 and the servo piston porting.

Figure 2:
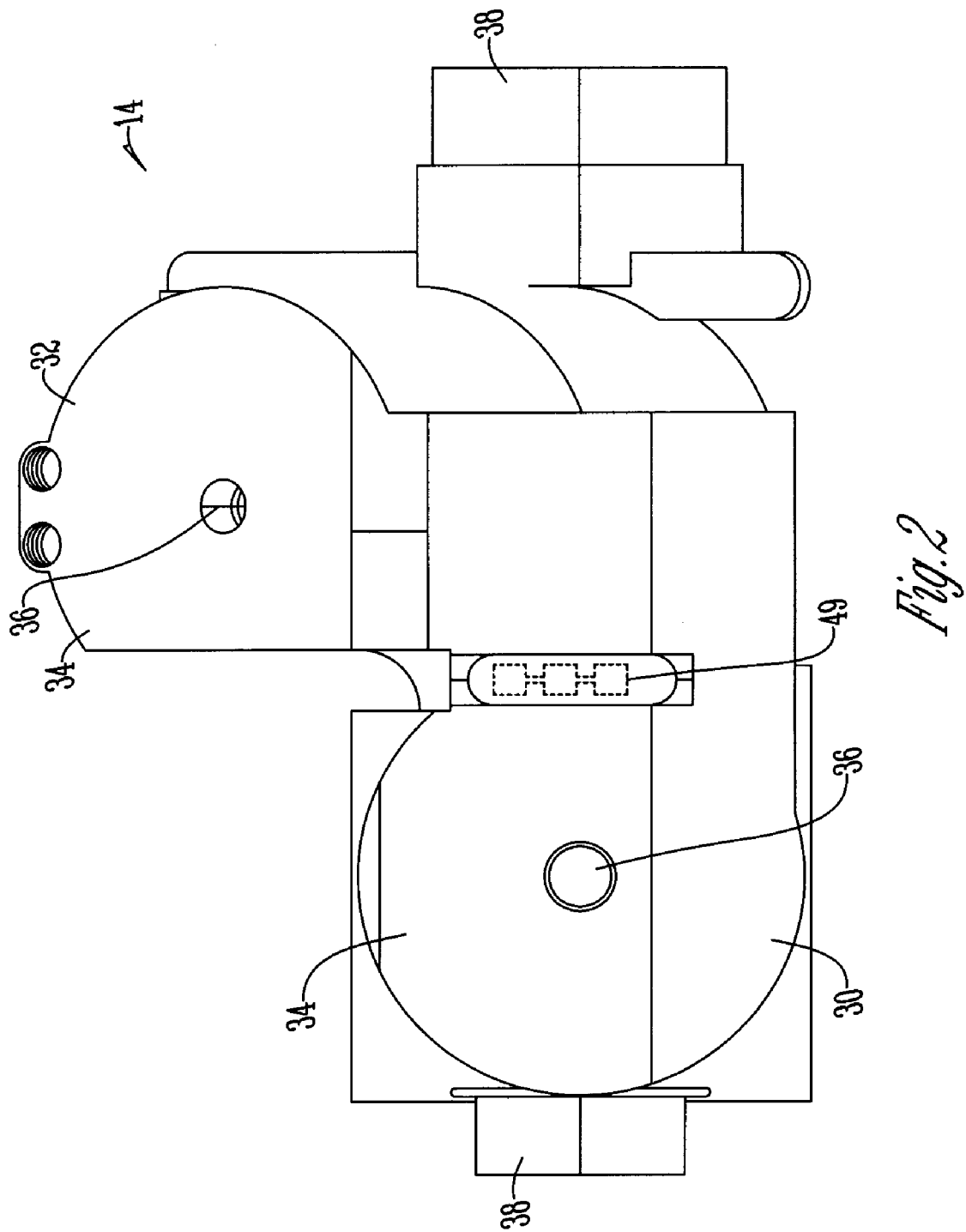
FIG. 2 is a side view of a dual yoke of a bent axis dual yoke hydromodule.
Figure 3:
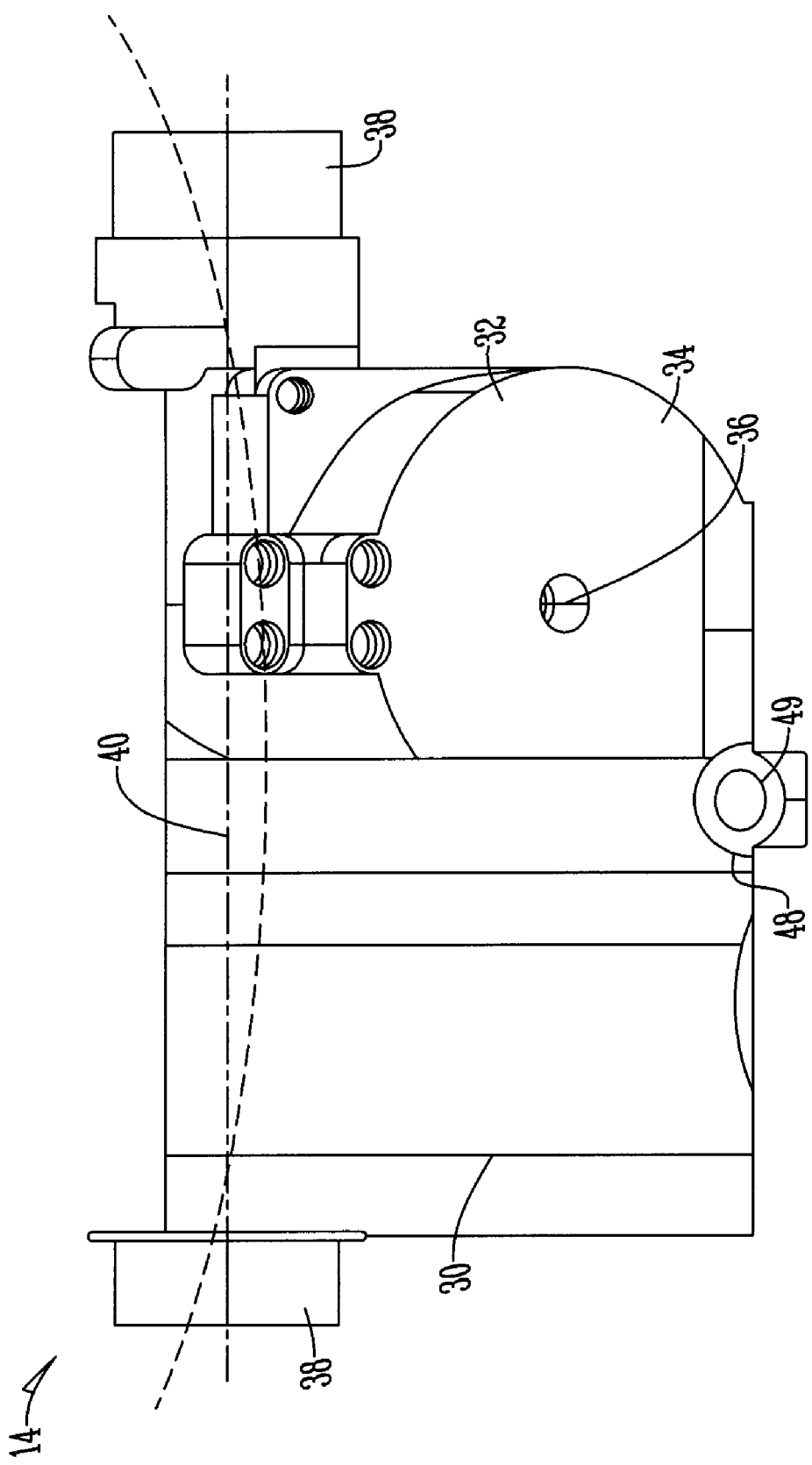
FIG. 3 is a top plan view of a dual yoke of a bent axis dual yoke hydromodule.
Figure 4:
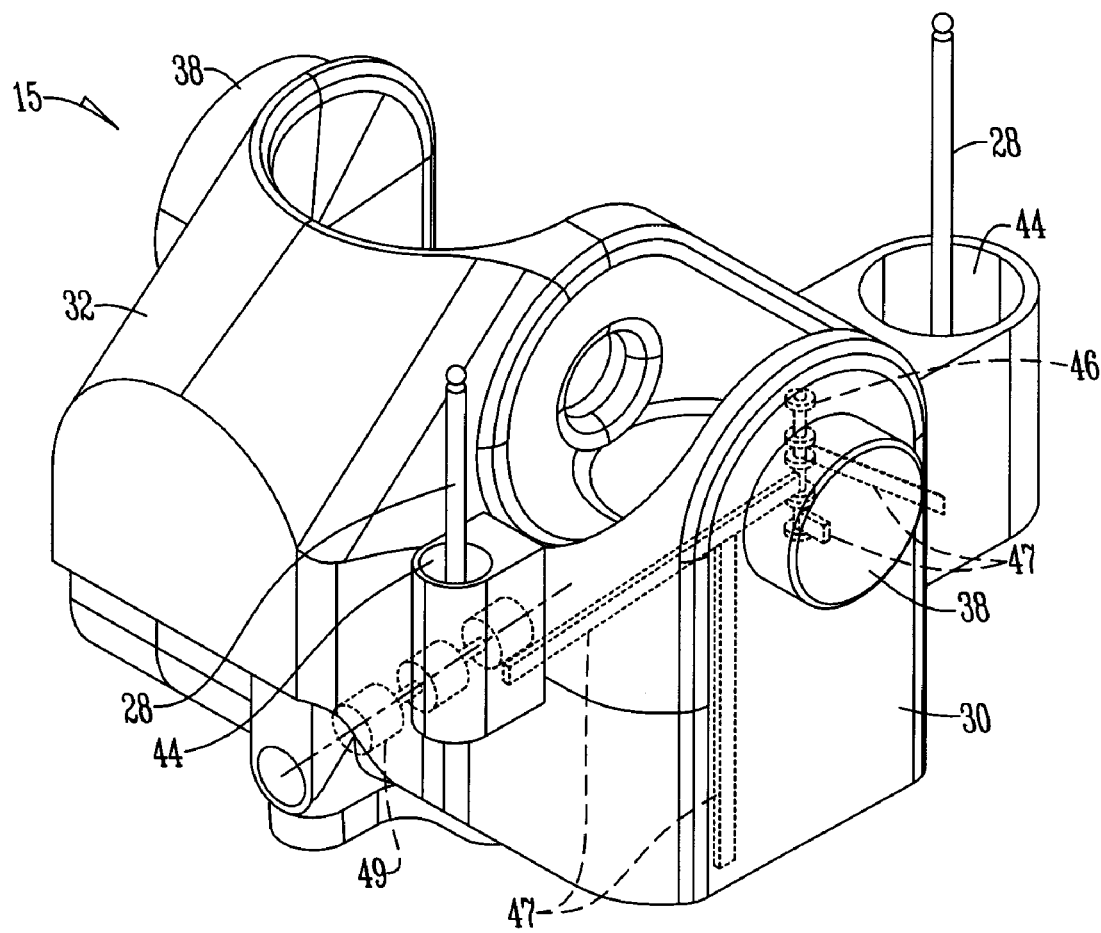
FIG. 4 is a top rear plan view of an additonal embodiment of a dual yoke of a bent axis dual yoke hydromodule.

FIGS. 2-4 show yokes 14 and 15. In a preferred embodiment the yoke 14 is a dual yoke with first and second yokes 30 and 32 being fluidly connected to one another. Specifically, each yoke 30 and 32 has internal porting (not shown) such that the first and second rotating kit fluidly connect to one another. The yoke 14 additionally has trunnions or journals 38 that are received by the receptacles 24 of the frame 12 such that the yoke 14 rotates about trunnion axis 40. Specifically, as the yoke 14 rotates about the trunnion axis 40 volumetric displacement is altered thus effecting the operation of the rotating kits 16.

The yoke 15 additionally has control valve and servo piston geometry integrated therein. Specifically, bias/control pressure is supplied through passageways (not shown) disposed within yoke 15 that are connected with a charge pressure circuit. Additionally, servo piston bores 44 are integrated with the yoke 15 and positioned about the trunnion 38 to provide fluid communication with servo pistons 28. Integrated in the yoke 15 is a control valve 46 that controls and provides fluid communication between servo piston bores 44 and servo pistons 28 through internal fluid porting 47 for servos. In a preferred embodiment the control valve 46 is a spool valve. Control valve 46 is oriented perpendicular to the trunnion axis 40 thereby minimizing any distortion resulting from yoke deflection.

Disposed within the yoke 14/15 and perpendicular to the trunnion axis 40 is a loop flush spool bore 48. By orientating the loop flush spool bore 48 perpendicular to the trunnion axis 40 the distortion along the length of the spool bore when the yoke is in a deflected state or under load is minimized. As a result, binding of the loop flush spool 49 is minimized.

In operation the yoke 14 sits within the frame 12 upon the trunnions 38 of the yoke 14. When porting within the hydromodule 10 needs to be altered the control valve 46 is actuated in order to actuate the servo pistons 28 to rotate the yoke 14 about the trunnion axis 40. As the yoke 14 is rotated, fluid flows through the porting within the yoke 14 to and from the rotating kits 16 to actuate the rotating kit shafts.

As a result of integrating the servo pistons 28 and control valve 46 within the hydromodule frame 12 or yoke 15 a more compact hydromodule having a reduced package size is provided. Further, the present design eliminates several parts thus minimizing the cost to manufacture the module 10. This is accomplished by having a hydromodule frame 12 or yoke 15 that has integrated servo piston support features. Additionally, the orientation of the control valve 46 or loop flush spool 49 valve in a yoke 30 or 32 such that the spool bore 48 deflection resulting from yoke deflection under load is minimized reduces the likelihood of interference between the spool (control valve 46) and its close fitting clearance in the bore. Finally, by having the yoke 15 with an integrated control valve 46 and servo cylinder geometry part counts are reduced by eliminating a separate control housing assembly. As a result, a reduced package size is provided and at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A bent axis hydromodule comprising:
a hydromodule yoke being rotatable about a trunnion and integrating a first yoke and second yoke wherein the first yoke and the second yoke are fluidly connected;
servo pistons and servo piston bores integrated with the hydromodule yoke and positioned on opposite sides of the trunnion wherein the servo piston bores provide fluid communication with the servo pistons;
servo piston porting integrated internally within the hydromodule yoke of the hydromodule such that the servo piston porting provides fluid communication between the servo piston bores and servo pistons positioned on opposite sides of the trunnion;
wherein the servo pistons are operable to rotate the hydromodule yoke about a trunnion axis;
a loop flush spool bore with a loop flush spool therein integrated within the hydromodule yoke in between the first yoke and the second yoke and perpendicular to the trunnion axis; and
a control valve in fluid communication with the servo piston porting to control the servo pistons, the control valve being integrated within the hydromodule yoke and being perpendicular to the trunnion axis and perpendicular to the loop flush spool bore,
such that distortion of the spool valve and the control valve from hydromodule yoke deflection is reduced.

2. The bent axis hydromodule of claim 1 wherein the control valve is a spool.

* * * * *